United States Patent
Tann et al.

(10) Patent No.: US 9,940,896 B2
(45) Date of Patent: Apr. 10, 2018

(54) TELECINE JUDDER REMOVAL SYSTEMS AND METHODS

(71) Applicant: APPLE INC., Cupertino, CA (US)

(72) Inventors: Christopher P. Tann, San Jose, CA (US); David S. Zalatimo, San Jose, CA (US); Marc Albrecht, San Francisco, CA (US); Sandro H. Pintz, Menlo Park, CA (US); Satish S. Iyengar, Saratoga, CA (US)

(73) Assignee: APPLE INC., Cupertino, CA (US)

( * ) Notice: Subject to any disclaimer, the term of this patent is extended or adjusted under 35 U.S.C. 154(b) by 311 days.

(21) Appl. No.: 14/636,693

(22) Filed: Mar. 3, 2015

(65) Prior Publication Data
US 2016/0260416 A1 Sep. 8, 2016

(51) Int. Cl.
*G09G 5/00* (2006.01)
*H04N 7/01* (2006.01)

(52) U.S. Cl.
CPC ..... *G09G 5/005* (2013.01); *G09G 2340/0407* (2013.01); *G09G 2340/0435* (2013.01); *H04N 7/0127* (2013.01)

(58) Field of Classification Search
CPC .......................... G09G 5/00; G09G 2340/0435
See application file for complete search history.

(56) References Cited

U.S. PATENT DOCUMENTS

| | | | |
|---|---|---|---|
| 7,158,186 B2 | 1/2007 | Selby et al. | |
| 7,508,449 B1 | 3/2009 | Greenberg | |
| 8,368,810 B2 | 2/2013 | Gong et al. | |
| 2006/0233248 A1* | 10/2006 | Rynderman | G11B 27/031 375/240.12 |
| 2008/0055318 A1 | 3/2008 | Glen | |
| 2008/0151109 A1* | 6/2008 | Doswald | H04N 7/0115 348/459 |
| 2010/0149414 A1* | 6/2010 | Chen | H04N 7/0112 348/447 |
| 2012/0178368 A1* | 7/2012 | Fleck | H04W 52/0274 455/41.2 |
| 2012/0257104 A1* | 10/2012 | Oh | H04N 7/0115 348/441 |
| 2013/0141642 A1* | 6/2013 | Wu | G06F 3/1407 348/441 |

(Continued)

*Primary Examiner* — Kent Chang
*Assistant Examiner* — Sujit Shah
(74) *Attorney, Agent, or Firm* — Fletcher Yoder PC

(57) ABSTRACT

One embodiment of the present disclosure describes an electronic display. The electronic display includes a display driver that write image frames to pixels of the electronic display with a first refresh rate or a second refresh rate, in which the second refresh rate is less than the first refresh rate. Additionally, the electronic display includes a timing controller that receives image frames from an image source, in which one or more of the image frames are configured to be displayed on the display panel to play video content; determines a capture rate of the video content based at least in part on a cadence with which the image frames are received, in which the capture rate describes a rate at which each of the one or more image frames was captured by an image sensor; and instructs the display driver to write the one or more of the image frames at the second refresh when the second refresh rate is an integer multiple of the capture rate.

21 Claims, 9 Drawing Sheets

(56) References Cited

U.S. PATENT DOCUMENTS

2014/0036148 A1 2/2014 Tanigawa et al.
2014/0267360 A1* 9/2014 Finkel .................. G06T 11/001
 345/590

* cited by examiner

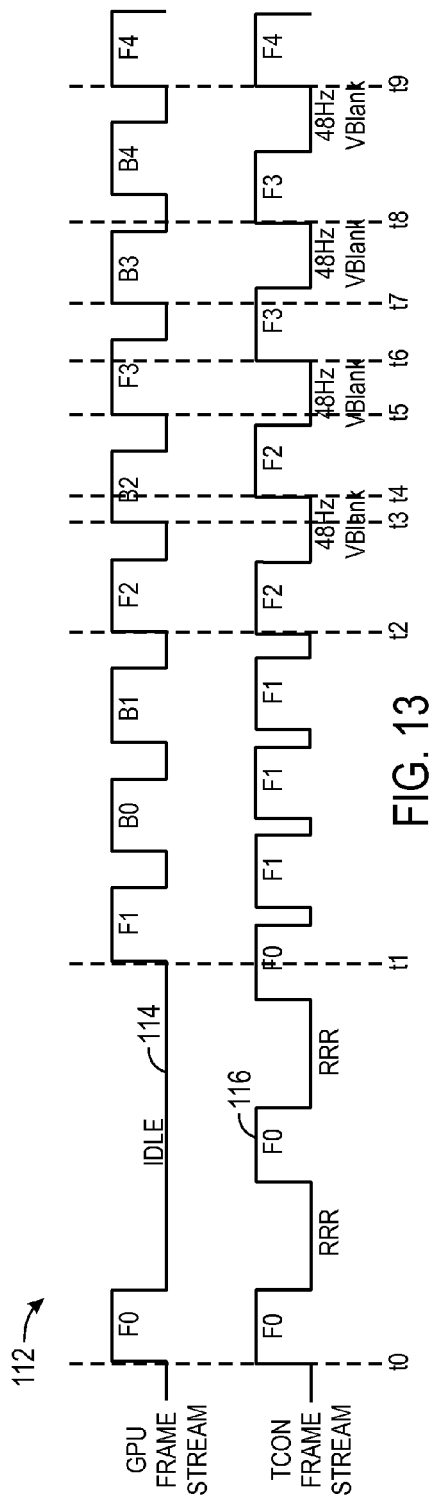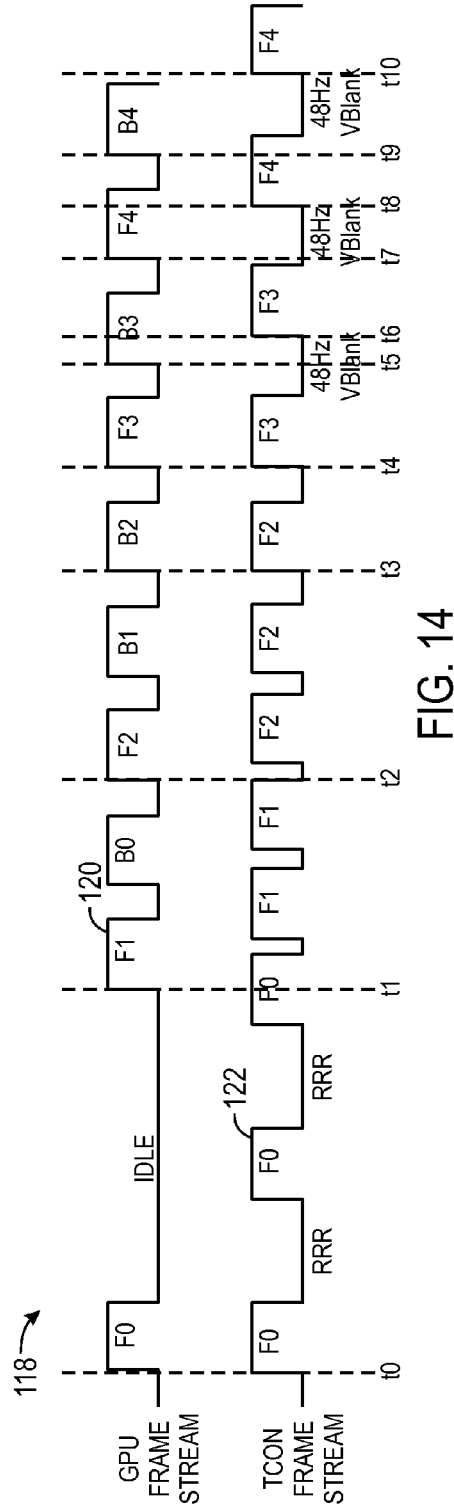

TELECINE JUDDER REMOVAL SYSTEMS AND METHODS

BACKGROUND

The present disclosure relates generally to an electronic display, and more particularly, to removing perceivable visual artifacts (e.g., telecine judder) on the electronic display.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Generally, an electronic display may enable a user to perceive visual representations of information by successively displaying image frames on a display panel. For example, image frames may be successively displayed to enable a user to perceive video content. In some embodiments, video content may be captured by an image sensor, for example, in a video camera. More specifically, the image sensor may generate video content data by periodically capturing digital representations of the video content as image frames, for example at 24 Hz. An image source may then process the video content data to generate display image data. The electronic display may then successively display image frames based at least in part on the display image data.

Some electronic displays may only be able to display image frames at a fixed refresh rate, for example 60 Hz. Accordingly, to enable even a fixed refresh rate electronic display to display the video content, the image source may generate the display image data with image frames that may be displayed at the fixed refresh rate (e.g., 60 Hz). More specifically, the image source convert image frames captured at a capture rate (e.g., 24 Hz) to image frames with a desired refresh rate (e.g., 60 Hz) different from the capture rate, for example, using telecine 3:2 pulldown. However, converting from a lower capture rate to a higher refresh rate often includes displaying image frames at an uneven cadence, which may be perceivable as a visual artifact (e.g., telecine judder).

As such, it would be beneficial to improve perceived image quality when the capture rate used to generate video content data is different from the desired refresh rate of display image data transmitted to an electronic display, for example, by reducing visual artifacts caused by an uneven display cadence.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure generally relates to improving perceived image quality of an electronic display particularly when the capture rate of video content varies from the desired refresh rate of image frames transmitted to an electronic display. More specifically, since each image frame is a still image, converting from a lower capture rate to a higher refresh rate often includes displaying image frames at an uneven cadence. For example, telecine 3:2 pulldown may be used to convert video content data captured at 24 Hz into display image data that has a desired refresh rate of 60 Hz. More specifically, when the video content data includes a first and a second image frame captured at 24 Hz, the display image data may instruct an electronic display to successively display the first image frame a duration equivalent to three 60 Hz image frames and the second image frame a duration equivalent to two 60 Hz image frames. However, the difference in duration the first image frame and the second image frame are displayed may be perceivable as a visual artifact (e.g., telecine judder).

Accordingly, the techniques described herein may improve perceived image quality by reducing the likelihood of perceivable visual artifacts, such as telecine judder. In some embodiments, the electronic display may reduce the likelihood of perceivable visual artifacts by determining the capture rate of the video content. More specifically, the electronic display may determine the capture rate based at least in part on the cadence with which display image data is received from the image source. For example, when the display image data instructs the electronic display to display a first image frame for a duration equivalent to three 60 Hz image frames and to display a second image frame for a duration equivalent to two 60 Hz image frames, the electronic display may determine that the capture rate of the video content is 24 Hz.

The electronic display may then display image frames based on the determined capture rate. More specifically, in some embodiments, the electronic display may have a variable refresh rate. In other words, the electronic display may display image frames at varying refresh rates, for example at any refresh rate between 1 Hz to 60 Hz. In such embodiments, the electronic display may display image frames at a refresh rate that is a multiple of the capture rate of the video content. For example, when the capture rate is 24 Hz, the electronic display may display image frames at 24 Hz or 48 Hz.

As such, the electronic display may display image frames at a refresh rate different from the desired refresh rate received from the image source. In this manner, the likelihood of perceivable visual artifacts (e.g., telecine judder) may be reduced because duration of successively displayed image frames of the video content is generally uniform.

BRIEF DESCRIPTION OF THE DRAWINGS

Various aspects of this disclosure may be better understood upon reading the following detailed description and upon reference to the drawings in which:

FIG. 13 is an example of a third hypothetical operation of an electronic display when display image data has a 3:2 cadence, in accordance with an embodiment; and FIG. 14 is an example of a fourth hypothetical operation of an electronic display when display image data has a 2:3 cadence, in accordance with an embodiment.

DETAILED DESCRIPTION

Figure 1:
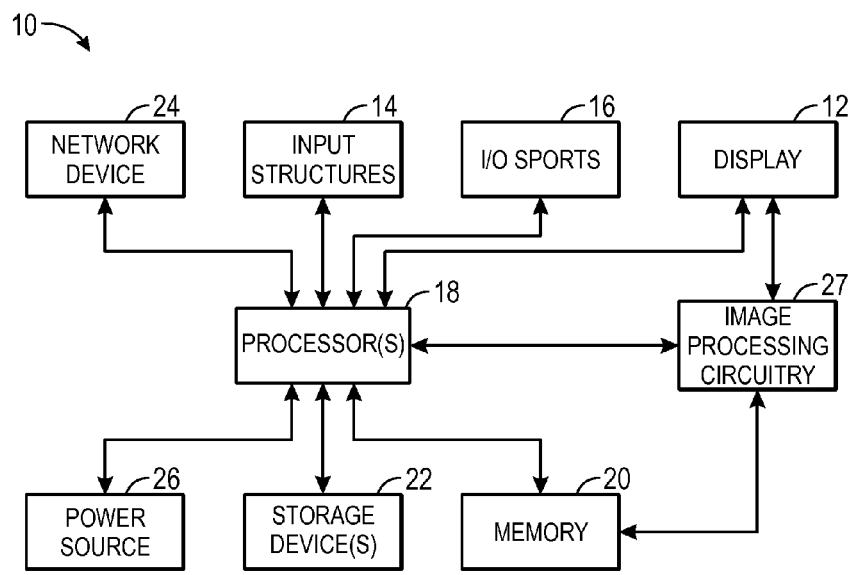
FIG. 1 is a block diagram of a computing device used to display image frames, in accordance with an embodiment.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As mentioned above, an electronic display may enable a user to perceive a visual representation of video content by successively display image frames based on video content data captured by an image sensor. In some embodiments, the image sensor may generate video content data by successively capturing digital representations of the video content as image frames. As used herein, the rate at which the image sensor captures the image frames is referred to as the "capture rate." In some embodiments, the capture rate of the video content data may be 24 Hz.

An image source (e.g., a graphics processing unit) may then process/analyze the video content data to generate display image data, which may instruct the electronic display to display image frames. More specifically, the display image data may include image frames and a desired refresh rate with which to display the image frames. As used herein, the "refresh rate" is intended to describe the rate at which an electronic display displays image frames.

In some embodiments, the image source may be capable of use with a variety of electronic displays, which may include electronic displays with a fixed refresh rate (e.g., 60 Hz). Accordingly, to accommodate a variety of electronic displays, the image source may generate display image data that instructs the electronic display to display image frames at a desired refresh rate equivalent to the fixed refresh rate. However, since the capture rate of the video content data may be different from the fixed refresh rate, the image source may convert image frames captured at the capture rate into image frames that may be displayed at the fixed refresh rate.

For example, using telecine 3:2 pulldown, the image source may convert video content data captured at 24 Hz to display image data that may be displayed at 60 Hz. More specifically, when the video content data includes a first and a second image frame captured at 24 Hz, the display image data may instruct an electronic display to display the first image frame for a duration equivalent to three 60 Hz image frames followed by the second image frame for a duration equivalent to two 60 Hz image frames.

In this manner, the video content data may be converted to the display image data, which includes image frames that may be displayed at a desired refresh rate equivalent to the fixed refresh rate. However, when the desired refresh rate is not a multiple of the capture rate, the duration each successive image frame is displayed may vary. For example, continuing with the above example, the first image frame may be displayed for a duration one and a half time longer than the second image frame. As such, the difference in duration the images are displayed may be perceivable as a visual artifact (e.g., telecine judder).

Various techniques may be used to reduce the likelihood of perceivable telecine judder. Some such techniques may utilize frame interpolation to generate new image frames based on the image frames captured by the image sensor. For example, continuing with the above example, a third image frame may be generated by interpolating the first image frame with the second image frame. As such, the display image data may instruct the electronic display to successively display the first image frame for a duration equivalent to two 60 Hz image frames, followed by the third image frame at 60 Hz, and followed by the second image frame for a duration equivalent to two 60 Hz image frames. In this manner, the duration the first image and the second image are displayed is approximately equal, thereby reducing the perceivability of telecine judder.

However, the frame interpolation may cause the generally undesirable "soap opera effect." More specifically, the interpolated (e.g., third) image frame may be determined by guessing what the video content was doing between the capture of an image frame (e.g., first image frame) displayed before and the capture of an image frame (e.g., second image frame) displayed after the interpolated image frame. As a result, the interpolated image frame may reduce motion blur between displayed image frames. Although possibility desirable when watching sports, the reduced motion blur is generally undesirable to a user watching video content captured at 24 Hz because the user may associate motion blurring with fiction and reduced motion blurring with a low quality production.

Accordingly, techniques described herein may improve perceived image quality by reducing the likelihood of perceivable telecine judder as well as a perceivable soap opera effect. For example, as will be described in more detail below, some embodiments describe an electronic display with a dynamic refresh rate (e.g., between 1 Hz-60 Hz) that includes a timing controller, which receives display image data from an image source. Based on the display image data, the timing controller may determine the capture rate of video content described by the display image data. More specifically, the timing controller may determine the capture rate based on cadence of the display image data. For example, the timing controller may detect that the display image data has a 3:2 cadence when the display image data instructs the electronic display to display a first image frame for a duration equivalent to three 60 Hz image frames and a second image frame for a duration equivalent to two 60 Hz image frames. Based on the 3:2 cadence, the timing controller may determine that the capture rate is 24 Hz.

The timing controller may then adjust the refresh rate of the dynamic refresh rate electronic display based on the determined capture rate. More specifically, the timing controller may instruct the electronic display to display image frames at a refresh rate that is a multiple of the capture rate. For example, when the capture rate is 24 Hz, the timing controller may instruct the electronic display to display image frames at 24 Hz or 48 Hz. In this manner, the likelihood of perceivable telecine judder may be reduced because duration image frames are displayed may generally be the same. Additionally, the likelihood of a perceivable soap opera effect may be reduced because motion blur is not produced by interpolating image frames. Furthermore, since writing image frames to the electronic display consumes power, adjusting the refresh rate lower than a normal refresh rate (e.g., 60 Hz) may also reduce power consumption.

In other words, the techniques described herein may improve perceived image quality of video content displayed on an electronic display while also reducing power consumption. To help illustrate, a computing device 10 that may utilize an electronic display 12 to display image frames is described in FIG. 1. As will be described in more detail below, the computing device 10 may be any suitable computing device, such as a handheld computing device, a tablet computing device, a notebook computer, and the like.

Accordingly, as depicted, the computing device 10 includes the electronic display 12, input structures 14, input/output (I/O) ports 16, one or more processor(s) 18, memory 20, nonvolatile storage 22, a network interface 24, a power source 26, and image processing circuitry 27. The various components described in FIG. 1 may include hardware elements (including circuitry), software elements (including computer code stored on a non-transitory computer-readable medium), or a combination of both hardware and software elements. It should be noted that FIG. 1 is merely one example of a particular implementation and is intended to illustrate the types of components that may be present in the computing device 10. Additionally, it should be noted that the various depicted components may be combined into fewer components or separated into additional components. For example, the image processing circuitry 27 (e.g., a graphics processing unit) may be included in the one or more processors 18.

As depicted, the processor 18 and/or image processing circuitry 27 are operably coupled with memory 20 and/or nonvolatile storage device 22. More specifically, the processor 18 and/or image processing circuitry 27 may execute instruction stored in memory 20 and/or non-volatile storage device 22 to perform operations in the computing device 10, such as generating and/or transmitting the display image data. As such, the processor 18 and/or image processing circuitry 27 may include one or more general purpose microprocessors, one or more application specific processors (ASICs), one or more field programmable logic arrays (FPGAs), or any combination thereof. Additionally, memory 20 and/or non volatile storage device 22 may be a tangible, non-transitory, computer-readable medium that stores instructions executable by and data to be processed by the processor 18 and/or image processing circuitry 27. In other words, the memory 20 may include random access memory (RAM) and the non-volatile storage device 22 may include read only memory (ROM), rewritable flash memory, hard drives, optical discs, and the like. By way of example, a computer program product containing the instructions may include an operating system or an application program.

Additionally, as depicted, the processor 18 is operably coupled with the network interface 24 to communicatively couple the computing device 10 to a network. For example, the network interface 24 may connect the computing device 10 to a personal area network (PAN), such as a Bluetooth network, a local area network (LAN), such as an 802.11x Wi-Fi network, and/or a wide area network (WAN), such as a 4G or LTE cellular network. Furthermore, as depicted, the processor 18 is operably coupled to the power source 26, which provides power to the various components in the computing device 10. As such, the power source 26 may includes any suitable source of energy, such as a rechargeable lithium polymer (Li-poly) battery and/or an alternating current (AC) power converter.

As depicted, the processor 18 is also operably coupled with I/O ports 16, which may enable the computing device 10 to interface with various other electronic devices, and input structures 14, which may enable a user to interact with the computing device 10. Accordingly, the inputs structures 14 may include buttons, keyboards, mice, trackpads, and the like. Additionally, in some embodiments, the display 12 may include touch sensitive components.

In addition to enabling user inputs, the display 12 may display image frames, such as a graphical user interface (GUI) for an operating system, an application interface, a still image, or video content. As depicted, the display is operably coupled to the processor 18 and the image processing circuitry 27. Accordingly, the image frames displayed by the display 12 may be based on display image data received from the processor 18 and/or the image processing circuitry 27.

As will be described in more detail below, the electronic display 12 may display image frames based at least in part on the capture rate of video content. More specifically, the electronic display 12 may determine the capture rate of displayed video content based at least in part on cadence of display image data received from the processor 18 and/or the image processing circuitry 27. For example, electronic display 12 may determine that the capture rate is 24 Hz when the received display image data has a 2:3 cadence or a 3:2 cadence. Based on the capture rate, the electronic display 12 may adjust its refresh rate to be a multiple of the capture rate, thereby improving image display quality and/or reducing power consumption.

Figure 2:
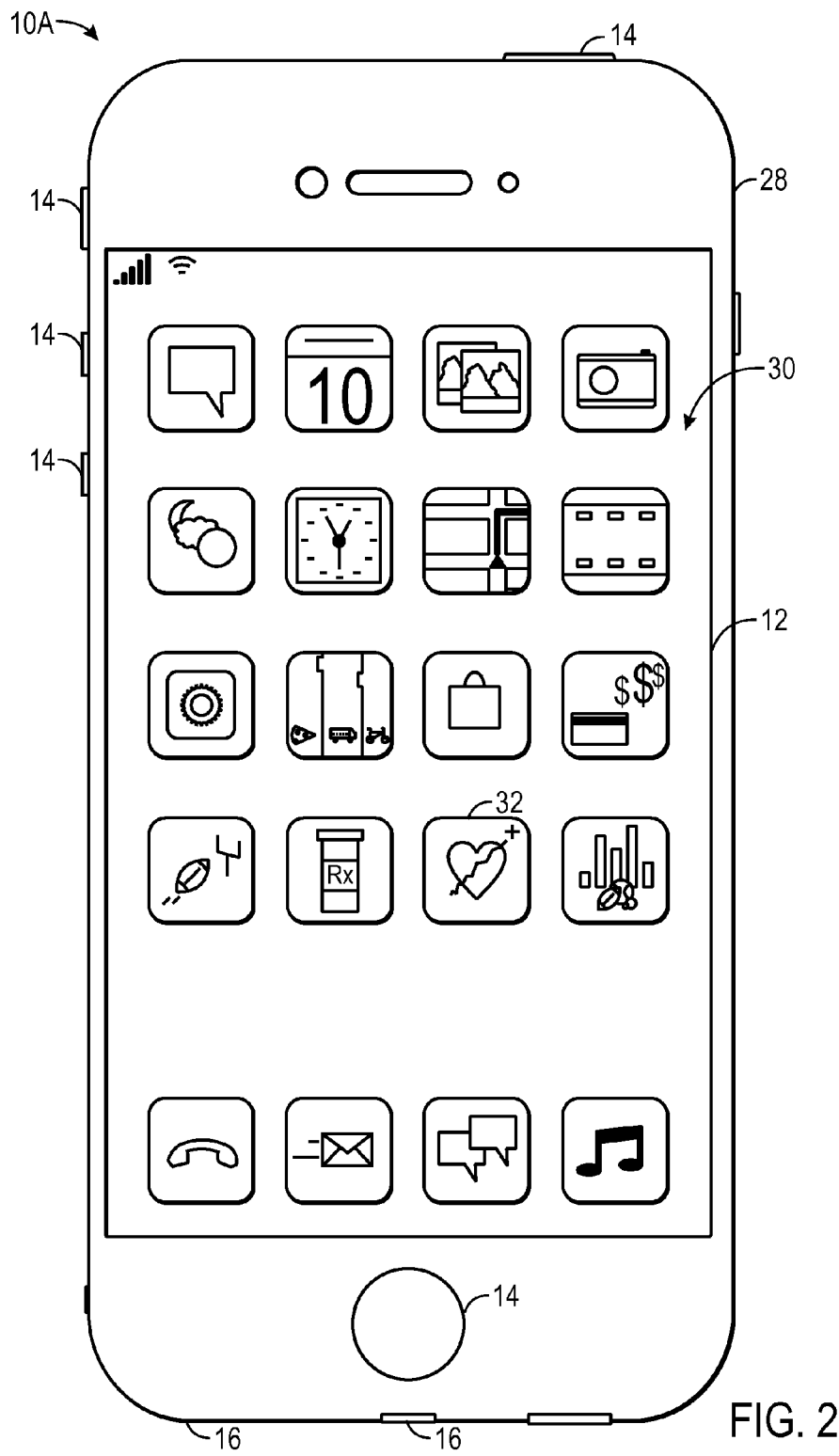
FIG. 2 is an example of the computing device of FIG. 1, in accordance with an embodiment.

As described above, the computing device 10 may be any suitable electronic device. To help illustrate, one example of a handheld device 10A is described in FIG. 2, which may be a portable phone, a media player, a personal data organizer, a handheld game platform, or any combination of such devices. For example, the handheld device 10A may be a smart phone, such as any iPhone model available from Apple Inc. As depicted, the handheld device 10A includes an enclosure 28, which may protect interior components from physical damage and to shield them from electromagnetic interference. The enclosure 28 may surround the display 12, which, in the depicted embodiment, displays a graphical user interface (GUI) 30 having an array of icons 32. By way of example, when an icon 32 is selected either by an input structure 14 or a touch sensing component of the display 12, an application program may launch.

Additionally, as depicted, input structure 14 may open through the enclosure 28. As described above, the input structures 14 may enable a user to interact with the handheld device 10A. For example, the input structures 14 may activate or deactivate the handheld device 10A, navigate a user interface to a home screen, navigate a user interface to a user-configurable application screen, activate a voice-recognition feature, provide volume control, and toggle between vibrate and ring modes. Furthermore, as depicted, the I/O ports 16 open through the enclosure 28. In some embodiments, the I/O ports 16 may include, for example, an audio jack to connect to external devices.

Figure 3:
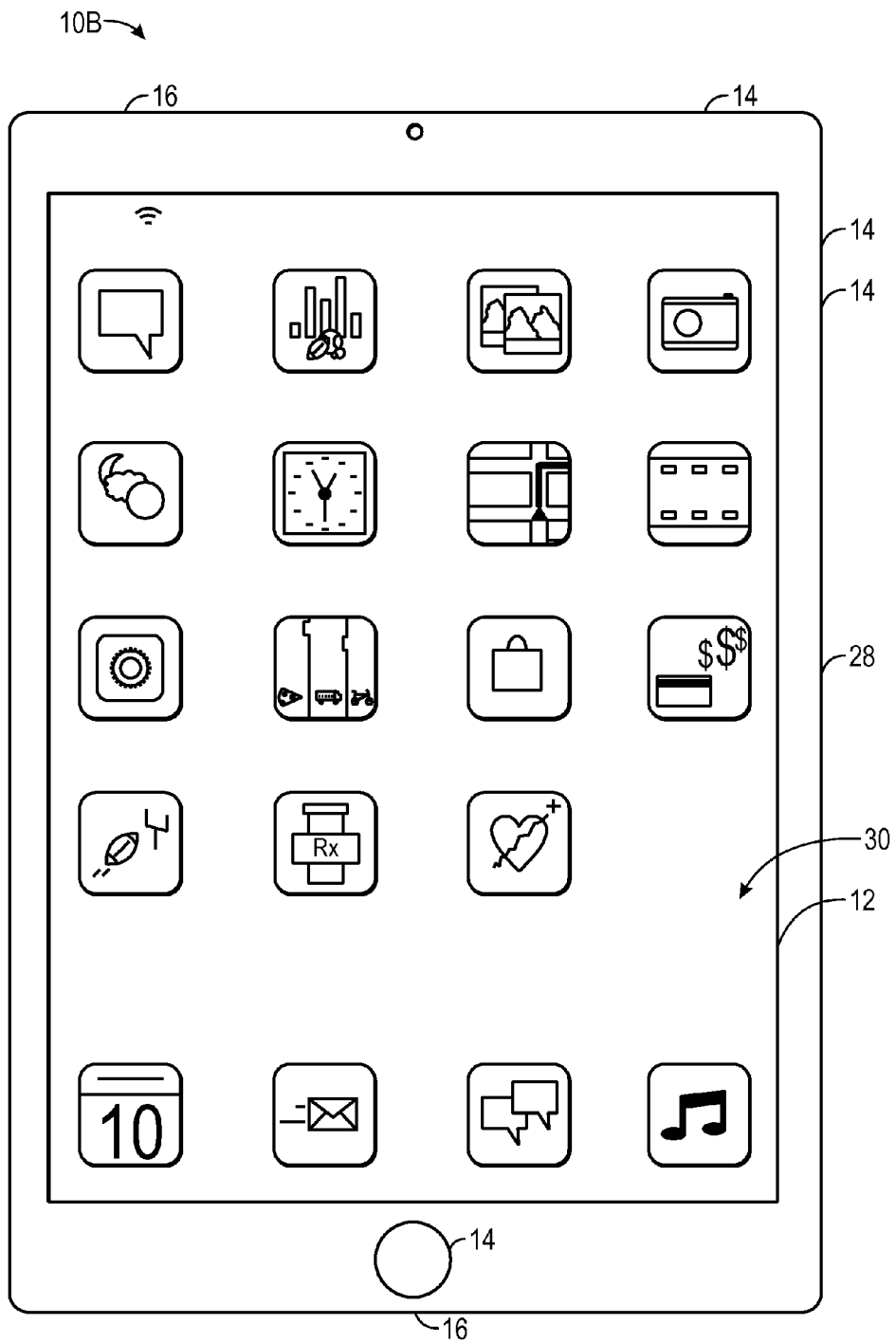
FIG. 3 is an example of the computing device of FIG. 1, in accordance with an embodiment.
Figure 4:
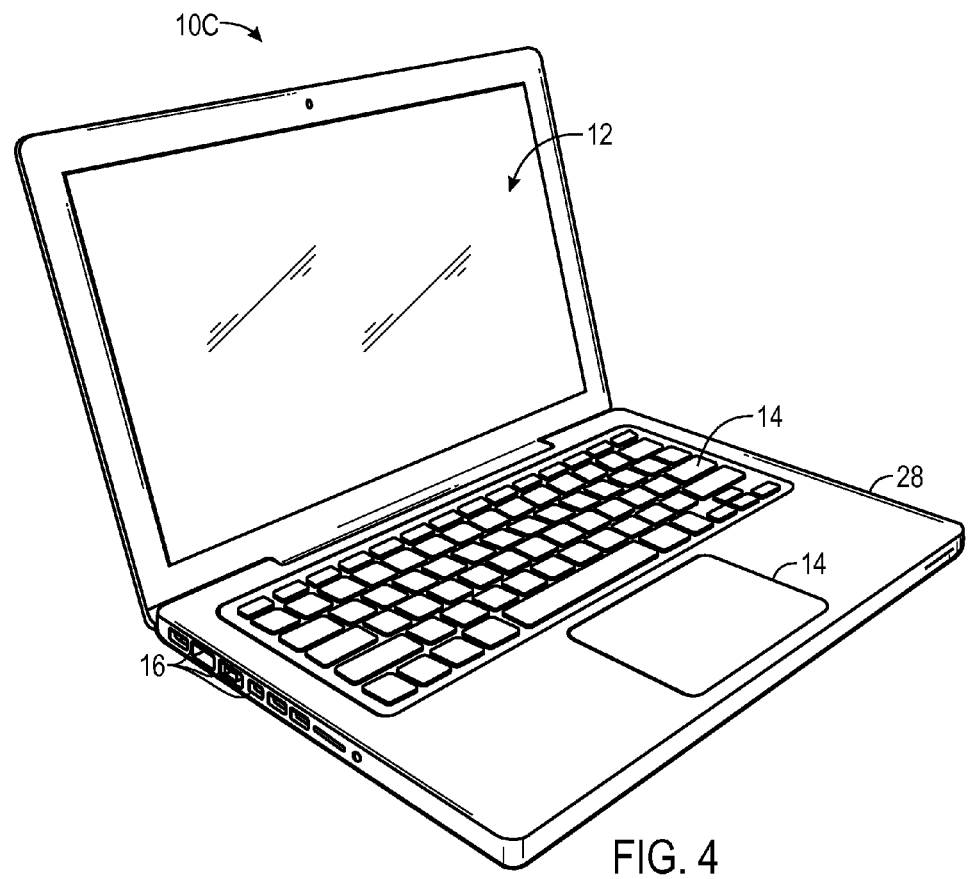
FIG. 4 is an example of the computing device of FIG. 1, in accordance with an embodiment.

To further illustrate a suitable computing device 10, a tablet device 10B is described in FIG. 3, such as any iPad model available from Apple Inc. Additionally, in other embodiments, the computing device 10 may take the form of a computer 10C as described in FIG. 4, such as any Macbook or iMac model available from Apple Inc. As depicted, the computer 10C also includes a display 12, input structures 14, I/O ports 16, and a housing 28.

Figure 5:
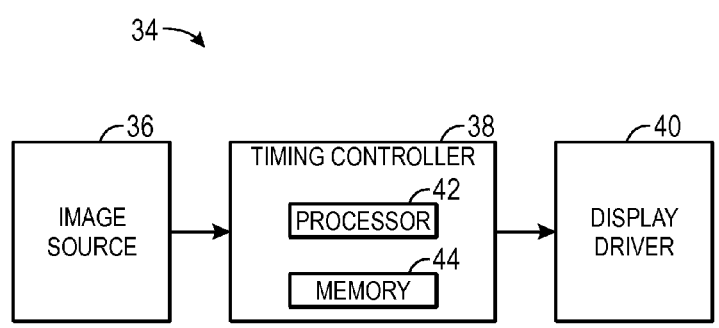
FIG. 5 is block diagram of a portion of the computing device of FIG. 1 used to display image frames, in accordance with an embodiment.

As described above, the electronic display 12 may display image frames based on display image data received from the processor 18 and/or the image processing circuitry 27. More specifically, to enable the display of the image frames, the display image data may be processed by any combination of the processor 18, the image processing circuitry 27, and the display 12 itself. To help illustrate, a portion 34 of the computing device 10 that processes and communicates display image data is described in FIG. 5.

As depicted, the portion 34 of the computing device 10 includes an image source 36, a timing controller (TCON) 38, and a display driver 40. More specifically, the image source 36 may generate display image data and transmit the display image data to the timing controller 38. Accordingly, in some embodiments, the image source 36 may include the processor 18 and/or the image processing circuitry 27. The timing controller 38 may then analyze the received display image data and instruct the driver 40 to write an image frame to pixels on a display panel by applying a voltage signal. As such, in some embodiments, the timing controller 38 and the display driver 40 may be included in the electronic display 12.

To facilitate processing/analyzing the image data and performing other operations, the timing controller 38 may include a processor 42 and memory 44. In some embodiments, the timing controller processor 42 may be included in the processor 18 and/or the image processing circuitry 27. In other embodiments, the timing controller processor 42 may be a separate processing module. Additionally, in some embodiments, the timing controller memory 44 may be included in memory 20, storage device 22, or another tangible, non-transitory, computer readable medium. In other embodiments, the timing controller memory 44 may be a separate tangible, non-transitory, computer readable medium that stores instructions executable by the timing controller processor 42. Additionally, the memory 44 may include a buffer to store the display image data for processing.

More specifically, the timing controller 38 may analyze the received display image data to determine the magnitude the voltage signal to apply to each pixel to achieve the desired image frame and instruct the driver 40 accordingly. Additionally, the timing controller 38 may analyze the received image data to determine the capture rate of displayed video content. In some embodiments, the timing controller 38 may determine the capture rate of video content based at least in part on cadence of the display image data received from the image source 36. The timing controller 38 may then instruct the display driver 40 to adjust refresh rate of the electronic display 12 used to successively display image frames based on the determined capture rate of the video content.

Figure 6:
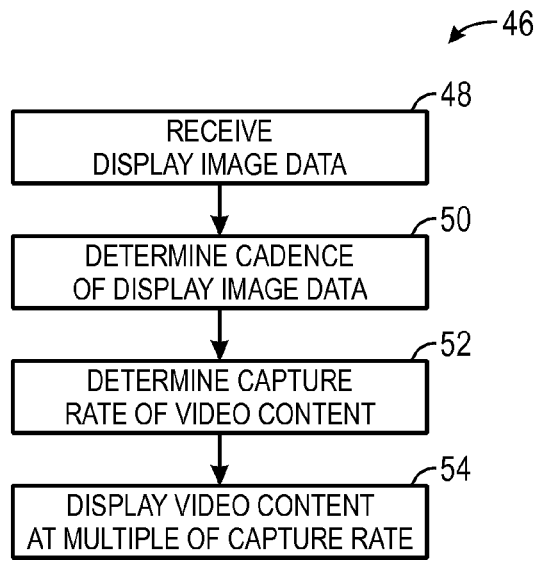
FIG. 6 is a flow diagram of a process for successively displaying image frames on an electronic display, in accordance with an embodiment.

To help illustrate, one embodiment of a process 46 for successively displaying image frames on the electronic display 12 is described in FIG. 6. Generally, the process 46 includes receiving display image data (process block 48), determining cadence of the display image data (process block 50), determining a capture rate of video content corresponding with the display image data (process block 52), and displaying the video content at a multiple of the capture rate (process block 54). In some embodiments, the process 46 may be implemented using instructions stored in the timing controller memory 44 and/or another suitable tangible non-transitory computer-readable medium and executable by the timing controller processor 42 and/or another suitable processing circuitry.

Accordingly, in some embodiments, the timing controller 38 may receive the display image data from the image source 36, for example, via a data bus in the computing system 10 (process block 48). As described above, the display image data may describe image frames to be displayed on the electronic display 12 and a desired refresh rate with which to display the image frames. More specifically, the timing controller 38 may receive the image frames as an source frame stream and store the image frames in memory (e.g., panel buffer) 44.

The timing controller 38 may then determine cadence of the display image data (process block 50). More specifically, the timing controller 38 may determine the cadence based on duration the display image data instructs the electronic display 12 to display each image frame. For example, when the display image data instructs the electronic display 12 to display a first image frame for a duration one and a half time longer than a second image frame, the timing controller 38 may determine that the cadence is a 3:2 cadence. Additionally, when the display image data instructs the electronic display 12 to display the second image frame for a duration one and a half times longer than the first image frame, the timing controller 38 may determine that the cadence is a 2:3 cadence.

To simplify the following discussion, the techniques are described in relation to video content with a capture rate of 24 Hz and an electronic display 12 with a normal refresh rate of 60 Hz. Nevertheless, one of ordinary skill in the art will understand that the following discussion is merely illustrative and be able to expand the techniques to other capture rates, other refresh rates, and/or other cadence patterns.

Figure 7:
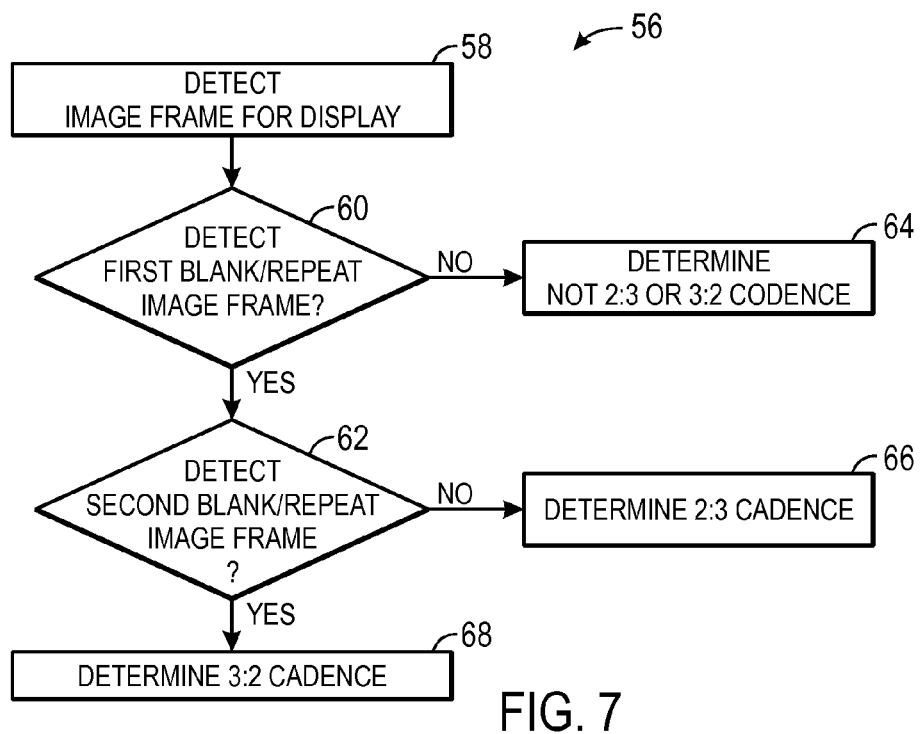
FIG. 7 is a flow diagram of a process for determining cadence of image frame received from an image source, in accordance with an embodiment.

To help illustrate the techniques described herein, one embodiment of a process 56 for determining cadence of display image data is described in FIG. 7. Generally, process 56 includes detecting an image frame for display (process block 58), detecting a first blank/repeat image frame (decision block 60), and detecting a second blank/repeat image frame (decision block 62). When the first blank/repeat image frame is not detected, the process 56 includes determining that the cadence is not a 2:3 cadence or a 3:2 cadence (process block 64). When the first blank/repeat frame is detected and the second blank/repeat frame is not detected, the process 56 includes determining that the cadence is a 2:3 cadence (process block 66). When the first and the second blank/repeat frame are detected, the process 56 includes determining that the cadence is a 3:2 cadence (process block 68). In some embodiments, the process 56 may be implemented using instructions stored in the timing controller memory 44 and/or another suitable tangible non-transitory computer-readable medium and executable by the timing controller processor 42 and/or another suitable processing circuitry.

Accordingly, the timing controller 38 may detect an image frame for display based on the display image data received from the image source 36 (process block 58). More specifically, the timing controller 38 may detect an image frame for display when the timing controller 38 receives an image frame that varies from an image frame displayed directly prior to the received image frame.

When the image frame for display is detected, the timing controller 38 may determine desired duration to display the image frame. Depending on the implementation, the image source 36 may utilize various techniques to instruct the electronic display 12 regarding desired duration to display the image frame. In some embodiments, the image source 36 may instruct the electronic display 12 to hold a displayed image frame by transmitting a repeated image frame or a blank image frame. As used herein, a "repeated image frame" and a "blank image frame" are intended to describe an image frame that does not instruct the electronic display to refresh.

For example, the image source 36 may instruct the electronic display hold a first image frame for a duration equivalent to two 60 Hz image frames by transmitting the first image frame at 60 Hz followed by a repeat of the first image frame or a blank image frame at 60 Hz. As described herein, the first image frame may be referred to as a "2-repeat frame" because it is held a duration equivalent to two 60 Hz image frames. Additionally, the image source 36 may instruct the electronic display hold a second image frame for a duration equivalent to three 60 Hz by transmitting the second image frame at 60 Hz, followed by a repeat of the second image frame or a blank image frame at 60 Hz, and followed by another repeat of the second image frame or another blank image frame at 60 Hz. As described herein, the second image frame may be referred to as a "3-repeat frame" because it is held a duration equivalent to three 60 Hz image frames.

Accordingly, the timing controller 38 may determine desired duration to display the image frame by detecting whether the image frame for display is followed by a first blank/repeat image frame and a second blank/repeat image frame (decision block 60 and 62). Thus, when the timing controller 38 detects that the image frame for display is followed by a first blank/repeat frame but not a second blank/repeat frame, the timing controller 38 may determine that the image frame is a 2-repeat frame. As such, the timing controller 38 may determine that the cadence of the display image data may be a 2:3 cadence (process block 66).

On the other hand, when the timing controller 38 detects that the image frame for display is followed by a first and a second blank/repeat frame, the timing controller 38 may determine that the desired duration to display the image frame is a 3-repeat frame. As such, the timing controller 38 may determine that the cadence of the display image data may be a 3:2 cadence (process block 68).

As can be appreciated, transmitting image frames from the image source 36 to the electronic display 12 may consume power. Accordingly, in some embodiments, the image source 36 may skip transmitting the repeat/blank image frames and instead transmit an idle pattern. For example, the image source 36 may utilize image data that includes the first image frame at 60 Hz, followed by an idle pattern equivalent to two 60 Hz image frames, followed by the second image frame at 60 Hz, and followed by an idle pattern equivalent a 60 Hz image frame. Thus, instead of detecting the presence of the first and/or second blank/repeat image frames, the timing controller 38 may determine whether duration of an idle pattern between received image frames is equivalent to a single 60 Hz image frame or a two 60 Hz image frames.

Figure 8:
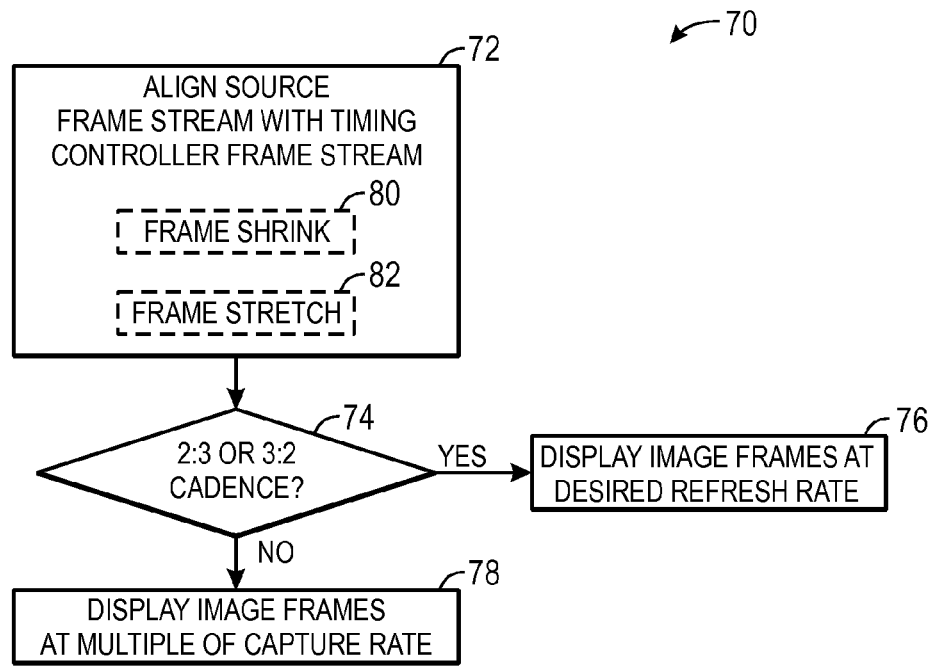
FIG. 8 is a flow diagram of a process for determine refresh rate with which to display image frames, in accordance with an embodiment.

As described above, the timing controller 38 may determine the capture rate of video content described by the display image data based on the determined cadence. To help illustrate, one embodiment of a process 70 for displaying images frames on the electronic display 12 is described in FIG. 8. Generally, the process 70 includes aligning a source frame stream and a timing controller frame stream (process block 72), determining whether the cadence of the display image data is a 2:3 cadence or a 3:2 cadence (decision block 74), displaying image frames at a desired refresh rate when the cadence is not a 2:3 cadence or a 3:2 cadence (process block 76), and displaying image frames at a multiple of the capture rate when the cadence is a 2:3 cadence or a 3:2 cadence (process block 78). In some embodiments, the process 70 may be implemented using instructions stored in the timing controller memory 44 and/or another suitable tangible non-transitory computer-readable medium and executable by the timing controller processor 42 and/or another suitable processing circuitry.

Accordingly, the timing controller 38 may align a source frame stream with a timing controller frame stream (process block 72). As used herein, the "source frame stream" is intended to describe a stream of image frames received from the image source 36 and the "timing controller frame stream" is intended to describe a stream of image frames that the timing controller 38 instructs the display driver 40 to display. More specifically, the timing controller 38 may receive image frames from the image source 36 via the source frame stream and may transmit the image frames to the display driver 40 via the timing controller frame stream. As such, the timing of the source frame stream and the timing controller frame stream may be synchronized to facilitate controlling the refresh rate of the image frames.

However, as described above, in some embodiments, an image source 36 may transmit an idle pattern to instruct the electronic display 12 to hold a displayed image frame. When the source frame stream is idle, the electronic display 12 may switch to a local timing, thereby enabling the timing of the source frame stream and the timing of the timing controller frame stream to drift. Thus, when the image source 36 resumes transmitting image frames, the timing controller 38 may re-align the source frame stream and the timing controller frame stream.

In some embodiments, the timing controller 38 may align the source frame stream and the timing controller frame stream using frame shrink precession (process block 80) and/or frame stretch precession (process block 82). For example, the timing controller 38 may use frame shrink precession to decrease the period between successive image frames on the timing controller frame stream until back in sync with the source frame stream. Additionally or alternatively, the timing controller 38 may use frame stretch precession to increase the period between successive image frames on the timing controller frame stream until back in sync with the source frame stream.

Once the source frame stream and the timing controller frame stream are aligned, the timing controller 38 may determine whether the display image data received via the source frame stream has a 2:3 cadence or a 3:2 cadence (decision block 74). When the display image data does not have a 2:3 cadence or a 3:2 cadence, the timing controller 38 may instruct the display driver 40 to write image frames using the desired refresh rate (e.g., 60 Hz) described by display image data (process block 76).

On the other hand, when the display data does have a 2:3 cadence or a 3:2 cadence, the timing controller 38 may instruct the display driver 40 to write image frames using a refresh rate that is a multiple of the capture rate (e.g., 24 Hz) (process block 78). For example, when the capture rate is 24 Hz, the timing controller 38 may instruct the display driver 40 to write image frames at a refresh rate of 24 Hz or 48 Hz. In this manner, perceived image quality may be improved by reducing the likelihood of perceivable judder because successively display image frames are displayed for generally equivalent durations and reducing the likelihood of a perceivable soap opera effect because frame interpolation is not used. Additionally, since the refresh rate may be lower than the desired refresh rate, the power consumption of the electronic display 12 may also be reduced.

Figure 9:
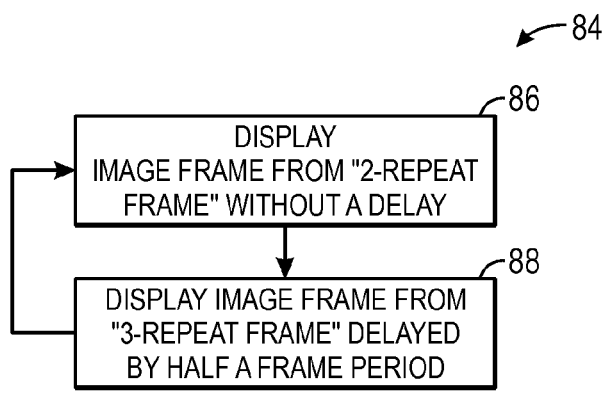
FIG. 9 is a flow diagram of a process for displaying image frames at a first display refresh rate (e.g., 24 Hz) that is a first multiple of the video content capture rate, in accordance with an embodiment.

One embodiments of a process 84 for displaying successive image frames at a first multiple of the capture rate is described in FIG. 9. More specifically, process 84 may be used when the displayed refresh rate (e.g., 24 Hz) is equivalent to the capture rate (e.g., 24 Hz). Generally, the process 84 includes displaying an image frame from a "2-repeat frame" without a delay (process block 86) and displaying an image frame from a "3-repeat frame" delayed by half a frame period (process block 88). In some embodiments, the process 84 may be implemented using instructions stored in the timing controller memory 44 and/or another suitable tangible non-transitory computer-readable medium and executable by the timing controller processor 42 and/or another suitable processing circuitry.

Figure 10:
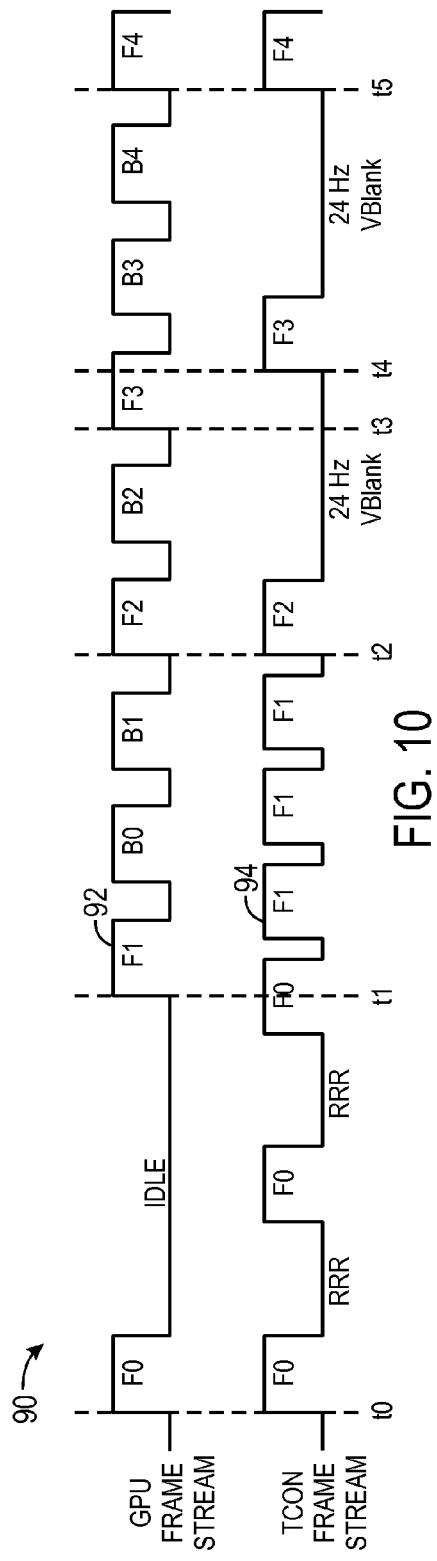
FIG. 10 is an example of a first hypothetical operation of an electronic display when display image data has a 3:2 cadence, in accordance with an embodiment.

Accordingly, the timing controller 38 may determine when to display image frames received from the image source 36 based on whether the image frame is a 2-repeat frame or a 3-repeat frame. To help illustrate, a first hypothetical display operation 90 is described in FIG. 10. More specifically, the hypothetical display operation 90 describes a source frame stream 92 and a timing controller frame stream 94 between t0 and t5.

In the depicted embodiment, at t0, the image source 36 transmits a first image frame to the electronic display 12 from via the source frame stream 92. Upon receiving the first image frame, the timing controller 38 may instruct the display driver 40 to write the first image frame to the display panel via the timing controller frame stream 94 at t0. As depicted, after transmitting the first image frame, the image source 36 transmits an idle pattern until t1, thereby instructing the electronic display 12 to hold the first image frame. As can be appreciated, the voltages held by the display panel to display the first image frame may gradually decrease the longer the voltages are held. Accordingly, as in the depicted embodiment, the timing controller 38 may periodically instruct the display driver 40 to re-write the first image frame between t0 and t1.

As described above, when the image source 36 transmits an idle pattern, the timing controller 38 may switch to a local timing to perform the periodical re-writing of the first image frame. However, this may cause the timing of the source frame stream 92 and the timing of the timing controller frame stream 94 to drift. For example, in the depicted embodiment, the timing may be out of sync when the timing controller 38 receives the second image frame at t1 because the display driver 40 is still in the process of re-writing the first image frame.

Thus, the timing controller 38 may begin to align the source frame stream 92 and the timing controller frame stream 94. More specifically, in the depicted embodiment, the timing controller 38 may use frame shrink precession to decrease the period between the writing of successive image frames. In other words, the timing controller 38 may decrease the duration between successive image frames on the timing controller frame stream 94 as compared to the duration between successive image frames on the source frame stream 92. In this manner, source frame stream 92 and the timing controller frame stream 94 may be aligned at t2.

Additionally, in the depicted embodiment, the image source 36 transmits two blank image frames following the second image frame via the source frame stream 92. More specifically, the two blank image frames may instruct the electronic display that the desired duration to display the second image frame is equivalent to three 60 Hz image frames. Although it may not be possible to display the second image frame for the desired duration (e.g., due to synchronization), the timing controller 38 may determine that the second image frame is a 3-repeat frame and that the display image data has a 3:2 cadence. Based on the cadence, the timing controller 38 may determine that the capture rate of video content described by the display image data may be 24 Hz.

Accordingly, when the image source 36 transmits a third image frame at t2, the timing controller 38 may determine that the third image frame is a 2-repeat frame because the pervious (e.g., second) image frame is a 3-repeat frame. As such, the timing controller 38 may instruct the display driver 40 to write the third image frame to the display panel without a delay via the timing controller frame stream 94 at t2.

At t3, the image source 36 transmits a fourth image frame to the electronic display 12. The timing controller 38 may determine that the fourth image frame is a 3-repeat frame because the previous (e.g., third) image frame was a 2-repeat frame. As such, the timing controller 38 may instruct the display driver 40 to write the fourth image frame to the display panel with a delay equivalent to half a frame period at t4. In this manner, the third image frame and the fourth image frame may be displayed with a 24 Hz refresh rate.

At t5, the image source 36 transmits a fifth image frame to the electronic display 12. The timing controller 38 may determine that the fifth image frame is a 2-repeat frame because the previous (e.g., fourth) image frame was a 3-repeat frame. As such, the timing controller 38 may instruct the display driver 40 to write the fifth image frame to the display panel without a delay at t5. In this manner, the fourth image frame and the fifth image frame may be displayed with a 24 Hz refresh rate.

Figure 11:
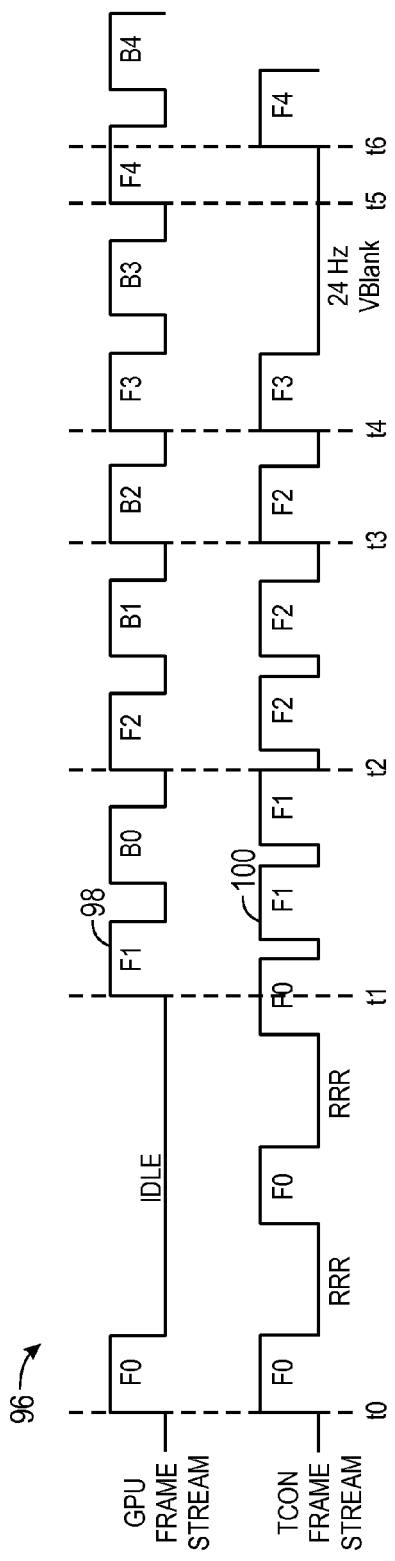
FIG. 11 is an example of a second hypothetical operation of an electronic display when display image has a 2:3 cadence, in accordance with an embodiment.

To further illustrate, a second hypothetical display operation 96 is described in FIG. 11. More specifically, the second hypothetical display operation 96 describes a source frame stream 98 and a timing controller frame stream 100 between t0 and t6. As in the first hypothetical display operation 90, at t0, the image source 36 transmits the first image frame to the timing controller 38 and the timing controller 38 instructs the display driver 40 to write the first image frame to the display panel. Additionally, between t0 and t1, the image source 36 transmits an idle pattern instructing the electronic display 12 to hold the first image frame. As such, the timing controller 38 periodically instructs the display driver 40 to re-write the first image frame between t0 and t1.

At t1, the image source 36 transmits a second image frame to the electronic display 12 via the source frame stream 98. However, as in the first hypothetical display operation 90, the source frame stream 98 and the timing controller frame stream 100 may be out of sync. Accordingly, the timing controller 38 may begin to align the source frame stream 98 and the timing controller frame stream 100 using frame shrink precession.

At t2, the image source 36 transmits a third image to the electronic display 12. However, as depicted, the source frame stream 98 and the timing controller frame stream 100 may still be out of sync. Accordingly, the timing controller 38 may continue to align the source frame stream 98 and the timing controller frame stream 100 using frame shrink precession. In this manner, source frame stream 98 and the timing controller frame stream 100 may be aligned at t3.

Additionally, in the depicted embodiment, the image source 36 transmits one blank image frames following the second image frame via the source frame stream 98. More specifically, the blank image frame may instruct the electronic display that the desired duration to display the second image frame is equivalent to two 60 Hz image frames (e.g., 2-repeat frame). Although it may not be possible to display the second image frame for the desired duration (e.g., due to synchronization), the timing controller 38 may determine that the second image frame is a 2-repeat frame and the display image data has a 2:3 cadence. In fact, the timing controller 38 may confirm the 2:3 cadence because the image source 36 transmits two blank image frames following the third image frame (e.g., 3-repeat frame). Based on the cadence, the timing controller 38 may determine that the capture rate of video content described by the display image data may be 24 Hz.

Accordingly, when the image source 36 transmits a fourth image frame at t4, the timing controller 38 may determine that the fourth image frame is a 2-repeat frame because the previous (e.g., third) image frame was a 3-repeat frame. As such, the timing controller 38 may instruct the display driver 40 to write the fourth image frame to the display panel without a delay at t4.

At t5, the image source 36 transmits a fifth image frame to the electronic display 12. The timing controller 38 may determine that the fifth image frame is a 3-repeat frame because the previous (e.g., fourth) image frame was a 2-repeat frame. As such, the timing controller 38 may instruct the display driver 40 to write the fifth image frame to the display panel with a delay equivalent to half a frame period at t5. In this manner, the fourth image frame and the fifth image frame may be displayed with a 24 Hz refresh rate.

Figure 12:
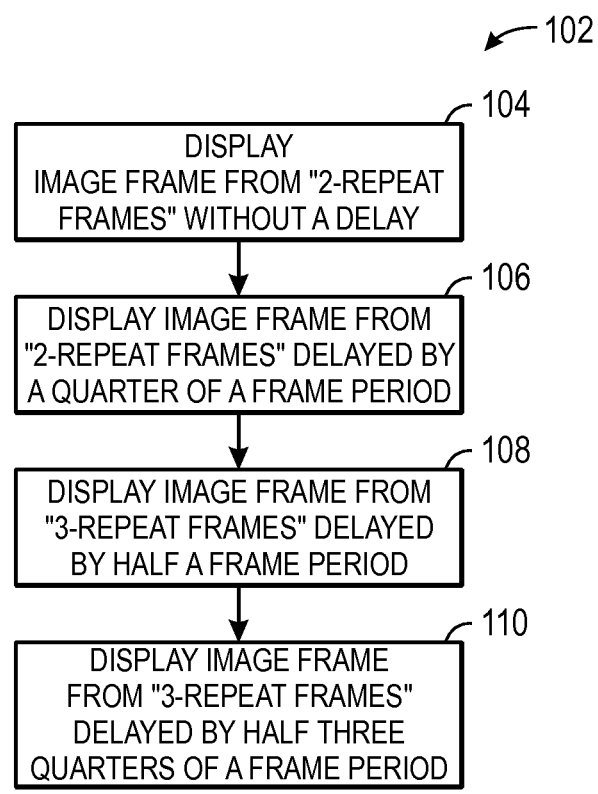
FIG. 12 is a flow diagram of a process for displaying image frames at a second display refresh rate (e.g., 48 Hz) that is a second multiple of the video content capture rate, in accordance with an embodiment.

As described above, the image frames may also be displayed at higher multiples of the capture rate. To help illustrate, a process 102 for displaying successive image frames at a second multiple of the capture rate is described in FIG. 12. More specifically, process 102 may be used when the displayed refresh rate (e.g., 48 Hz) is twice the capture rate (e.g., 24 Hz). Generally, the process 102 includes displaying an image frame from a "2-repeat frame" without a delay (process block 104), displaying the image frame from the "2-repeat frame" delayed by a quarter of a frame period (process block 106), displaying an image frame from a "3-repeat frame" delayed by half a frame period (process block 108), and displaying the image frame from the "3-repeat frame" delayed by three quarters of a frame period (process block 110). In some embodiments, the process 102 may be implemented using instructions stored in the timing controller memory 44 and/or another suitable tangible non-transitory computer-readable medium and executable by the timing controller processor 42 and/or another suitable processing circuitry.

Accordingly, similar to process 84, the timing controller 38 may determine when to display image frames received from the image source 36 based on whether the image frame is a 2-repeat frame or a 3-repeat frame. Additionally, the timing controller 38 may determine to display image frames based on whether it is a repeat image frame. To help illustrate, a third hypothetical display operation 112 is described in FIG. 13. More specifically, the hypothetical display operation 112 describes a source frame stream 114 and a timing controller frame stream 116 between t0 and t9.

As in the first and second hypothetical display operations 90 and 96, at t0, the image source 36 transmits the first image frame to the timing controller 38 and the timing controller 38 instructs the display driver 40 to write the first image frame to the display panel. Additionally, between t0 and t1, the image source 36 transmits an idle pattern instructing the electronic display 12 to hold the first image frame. As such, the timing controller 38 periodically instructs the display driver 40 to re-write the first image frame between t0 and t1.

At t1, the image source 36 transmits a second image frame via the source frame stream 114. However, the source frame stream 114 and the timing controller frame stream 116 may be out of sync. Accordingly, the timing controller 38 may begin to align the source frame stream 114 and the timing controller frame stream 116 using frame shrink precession. In this manner, source frame stream 114 and the timing controller frame stream 116 may be aligned at t2.

Additionally, similar to first hypothetical display operation 90, the image source 36 transmits two blank image frames following the second image frame. Accordingly, the timing controller 38 may determine that the second image frame is a 3-repeat frame and that the display image data has a 3:2 cadence. Based on the cadence, the timing controller 38 may determine that the capture rate of video content described by the display image data may be 24 Hz.

Accordingly, when the image source 36 transmits a third image frame via the source frame stream 114 at t2, the timing controller 38 may determine that the third image frame is a 2-repeat frame because the previous (e.g., second) image frame was a 3-repeat frame. As such, the timing controller 38 may instruct the display driver 40 to write the third image frame to the display panel without a delay via the timing controller frame stream 116 at t2.

At t3, the image source 36 transmits a blank image frame to the electronic display 12, thereby instructing the electronic display to repeat the third image frame. As such, the timing controller 38 may instruct the display driver 40 to re-write the third image frame to the display panel with a delay equivalent to a quarter of a frame period at t4. In this manner, the third image frame may be successively displayed with a 48 Hz refresh rate.

At t5, the image source 36 transmits a fourth image frame to the electronic display 12. The timing controller 38 may determine that the fourth image frame is a 3-repeat frame because the previous (e.g., third) image frame was a 2-repeat frame. As such, the timing controller 38 may instruct the display driver 40 to write the fourth image frame to the display panel with a delay equivalent to half a frame period at t6. In this manner, the third image frame and the fourth image frame may be displayed with a 48 Hz refresh rate.

At t7, the image source transmits a blank image frame to the electronic display 12, thereby instructing the electronic display to repeat the fourth image frame. As such, the timing controller 38 may instruct the display driver 40 to re-write the fourth image frame to the display panel with a delay equivalent to three quarters of a frame period at t8. In this manner, the fourth image frame may be successively displayed with a 48 Hz refresh rate.

At t9, the image source 36 transmits a fifth image frame to the electronic display 12. The timing controller 38 may then determine that the fourth image frame is a 2-repeat frame because the previous (e.g., fourth) image frame was a 3-repeat frame. As such, the timing controller 38 may instruct the display driver 40 to write the fourth image frame to the display panel without a delay at t9. In this manner, the fourth image frame and the fifth image frame may be displayed with a 48 Hz refresh rate.

To further illustrate, a fourth hypothetical display operation 118 is described in FIG. 14. More specifically, the hypothetical display operation 118 describes a source frame stream 120 and a timing controller frame stream 122 between t0 and t10. As in the third hypothetical display operation 112, at t0, the image source 36 transmits the first image frame to the timing controller 38 and the timing controller 38 instructs the display driver 40 to write the first image frame to the display panel. Additionally, between t0 and t1, the image source 36 transmits an idle pattern instructing the electronic display 12 to hold the first image frame. As such, the timing controller 38 periodically instructs the display driver 40 to re-write the first image frame between t0 and t1.

At t1, the image source 36 transmits a second image frame to the electronic display 12 via the source frame stream 120. However, as in hypothetical operation 120, the source frame stream 120 and the timing controller frame stream 122 may be out of sync. Accordingly, the timing controller 38 may begin to align the source frame stream 120 and the timing controller frame stream 122 using frame shrink precession.

At t2, the image source 36 transmits a third image frame to the electronic display 12. However, as depicted, the source frame stream 120 and the timing controller frame stream 122 may still be out of sync. Accordingly, the timing controller 38 may continue to align the source frame stream 120 and the timing controller frame stream 122 using frame shrink precession. In this manner, source frame stream 98 and the timing controller frame stream 100 may be aligned at t3.

Additionally, similar to the second hypothetical display operation 96, the image source 36 transmits a blank image frame following the second image frame v. Accordingly, the timing controller 38 may determine that the second image frame is a 2-repeat frame and that the display image data has a 2:3 cadence. In fact, the timing controller 38 may confirm the 2:3 cadence because the image source 36 transmits two blank image frames following the third image frame (e.g., 3-repeat frame). Based on the cadence, the timing controller 38 may determine that the capture rate of video content described by the display image data may be 24 Hz.

Accordingly, when the image source 36 transmits a fourth image frame to the electronic display 12 at t4, the timing controller 38 may determine that the fourth image frame is a 2-repeat frame because the previous (e.g., third) image frame was a 3-repeat frame. As such, the timing controller 38 may instruct the display driver 40 to write the fourth image frame to the display panel without a delay via the timing controller frame stream 100 at t4.

At t5, the image source 36 transmits a blank image frame to the electronic display 12, thereby instructing the electronic display to repeat the fourth image frame. As such, the timing controller 38 may instruct the display driver 40 to re-write the fourth image frame to the display panel with a delay equivalent to a quarter of a frame period at t6. In this manner, the fourth image frame may be successively displayed with a 48 Hz refresh rate.

At t7, the image source 36 transmits a fifth image frame to the electronic display 12. The timing controller 38 may then determine that the fifth image frame is a 3-repeat frame because the previous (e.g., fourth) image frame was a 2-repeat frame. As such, the timing controller 38 may instruct the display driver 40 to write the fifth image frame to the display panel with a delay equivalent to half a frame period at t8. In this manner, the fourth image frame and the fifth image frame may be displayed with a 48 Hz refresh rate.

At t9, the image source 36 transmits a blank image frame to the electronic display 12, thereby instructing the electronic display to repeat the fifth image frame. As such, the timing controller 38 may instruct the display driver 40 to re-write the fifth image frame to the display panel with a delay equivalent to three quarters of a frame period at t10. In this manner, the fifth image frame may be successively displayed with a 48 Hz refresh rate.

Accordingly, the technical effects of the present disclosure include improving perceived image quality of an electronic display. More specifically, in some embodiments, the electronic display may determine a capture rate of video content based at least in part on cadence of display image data received from an image source. The electronic display may then display image frames at a refresh rate based on the capture rate of the video content. In this manner, the likelihood of perceivable visual artifacts (e.g., telecine judder) may be reduced because successively display image frames are displayed for generally equivalent durations. Additionally, the likelihood of a perceivable soap opera effect may be reduced because frame interpolation is not used. Furthermore, since the refresh rate may be lower than a desired refresh rate described by the display image data, the power consumption of the electronic display may also be reduced.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:
1. An electronic display comprising:
a display driver configured to write image frames to pixels of the electronic display with a first refresh rate or a second refresh rate, wherein the second refresh rate is less than the first refresh rate; and
a timing controller communicatively coupled to the display driver, wherein the timing controller is configured to:

receive a first image frame and a second image frame to be displayed on the electronic display to play video content from an image source;

determine a capture rate of the video content based at least in part on a cadence with which the first image frame and the second image frame are received, wherein the capture rate comprises a rate at which each image frame of the video content was captured by an image sensor; and instruct the display driver to write the first image frame and the second image frame using the second refresh when the second refresh rate is an integer multiple of the capture rate, wherein:

to facilitate maintaining operational synchronization with the image source, the first image frame is written without a delay relative to when the timing controller receives the first image frame and the second image frame is written directly after the first image frame with a half frame period delay relative to when the timing controller receives the second image frame; and to facilitate improving perceived video quality of the video content, the first image frame is written without interpolation with the second image frame and the second image frame is written without interpolation with the first image frame.

2. The electronic display of claim 1, wherein the timing controller is configured to align timing of the image source and timing of the timing controller using frame shrink precession or frame stretch precession before instructing the display driver to write the first image frame at the second refresh rate.

3. The electronic display of claim 1, wherein the timing controller is configured to:

detect a 2:3 cadence when the timing controller receives a single blank image frame between the first image frame and the second image frame from the image source; and detect a 3:2 cadence when the timing controller receives two blank image frames between the first image frame and the second image frame from the image source.

4. A tangible, non-transitory, computer readable medium storing instructions executable by at least one processor of an electronic display, wherein the instructions comprise instructions to: determine, using the at least one processor, cadence with which image frames corresponding to video content are received from an image source communicatively coupled to the electronic display; determine, using the at least one processor, a capture rate of the video content based at least in part on the cadence with which the image frames are received, wherein the capture rate of the video content comprises a rate with which each of the image frames of the video content was captured; and instruct, using the at least one processor, the electronic display to display the video content by displaying each of the image frames at an integer multiple of the capture rate without interpolation with any other of the image frames to facilitate improving perceiving image quality of the video content;

wherein the instructions to instruct the electronic display to display the video content comprise instructions to: instruct the electronic display to a first image frame of the video content without a delay relative to when the first image frame is received; and instruct the electronic display to display a second image frame of the video content with a half frame period delay relative to when the second image frame is received to facilitate maintaining operational synchronization between the electronic display and the image source.

5. The electronic display of claim 1, wherein the timing controller is configured to instruct the display driver to write the first image frame and the second image frame at an integer multiple of 24 Hz when the cadence with which the first image frame and the second image frame are received is a 2:3 cadence or a 3:2 cadence.

6. The electronic display of claim 1, wherein the first refresh rate is 60 Hz, the second refresh rate is 24 Hz, and the capture rate is 24 Hz.

7. The electronic display of claim 1, wherein the first refresh rate is 60 Hz, the second refresh rate is 48 Hz, and the capture rate is 24 Hz.

8. A tangible, non-transitory, computer readable medium storing instructions executable by at least one processor of an electronic display, wherein the instructions comprise instructions to:

determine, using the at least one processor, cadence with which image frames corresponding to video content are received from an image source communicatively coupled to the electronic display;

determine, using the at least one processor, a capture rate of the video content based at least in part on the cadence with which the image frames are received, wherein the capture rate of the video content comprises a rate with which each of the image frames of the video content was captured; and instruct, using the at least one processor, the electronic display to display the video content by displaying each of the image frames at an integer multiple of the capture rate without interpolation with any other of the image frames to facilitate improving perceiving image quality of the video content.

wherein the instructions to instruct the electronic display to display the video content comprise instructions to: instruct the electronic display to a first image frame of the video content without delay relative to when the first image frame received; and instruct the electronic display a second image frame of the video content with a half frame period delay relative to when the second image frame is received to facilitate maintaining operational synchronization between the electronic display and the image source.

9. The tangible, non-transitory, computer readable medium of claim 8, wherein the integer multiple of the capture rate is different from a desired refresh rate indicated by the image source.

10. The tangible, non-transitory, computer readable medium of claim 8, wherein the instructions to determine the cadence with which the image frames are received comprises instructions to:

detect, using the at least one processor, a 2:3 cadence when the electronic display receives a first image frame of the video content and a second image frame of the video content separated by a single repeat image frame; and detect, using the at least one processor, a 3:2 cadence when the electronic display receives the first image frame of the video content and the second image frame of the video content separated by two repeat image frames.

11. The tangible, non-transitory, computer readable medium of claim 8, comprising instructions to align, using the at least one processor, timing of the image source and timing of the electronic display by decreasing duration between displayed image frames or increasing duration between displayed image frames.

12. The tangible, non-transitory, computer readable medium of claim 8, wherein the integer multiple of the capture rate is an integer multiple of 24 Hz and image data corresponding with the video content received from the image source indicates a desired refresh rate of 60 Hz.

13. A method comprising:
receiving, using a timing controller of an electronic display, image frames corresponding to video content from an image source via a source frame stream;
determining, using the timing controller, a rate at which the image frames of the video content were captured based at least in part on cadence with which the image frames are received via the source frame stream; and
generating, using the timing controller, a timing controller frame stream that instructs a display driver to write:
a first image frame of the video content without a delay relative to the source frame stream; and
a second image frame of the video content directly after the first image frame with a half frame period delay relative to the source frame stream to facilitate maintaining operational synchronization between the electronic display and the image source while displaying one or more of the image frames of the video content at a refresh rate that is a multiple of the rate at which the image frames were captured.

14. The method of claim 13, comprising aligning the source frame stream and the timing controller frame stream before instructing the display driver to write the one or more of the image frames at the refresh rate.

15. The method of claim 13, wherein generating the timing controller frame stream comprises:
determining the first image frame from the source frame stream without interpolation with any other of the image frames corresponding with the video content and determining the second image frame from the source frame stream without interpolation with any other of the image frames corresponding with the video content.

16. The method of claim 13, comprising:
detecting, using the timing controller, a 2:3 cadence when the timing controller receives the first image frame and the second image frame separated by a single blank image frame on the source frame stream; and
detecting, using the timing controller, a 3:2 cadence when the timing controller receives the first image frame and the second image frame separated by two blank image frames on the source frame stream.

17. The method of claim 13, wherein determining the rate at which the image frames were captured comprises determining that the rate at which the image frames were captured is 24 Hz when the cadence with which the image frames are received via the source frame stream is a 2:3 cadence or a 3:2 cadence.

18. The method of claim 13, wherein receiving the image frames from the image source comprises storing corresponding image data in a panel buffer memory.

19. A tangible, non-transitory, computer readable medium storing instructions executable by at least one processor of an electronic display, wherein the instructions comprise instructions to:
detect, using the at least one processor, that a first image frame received from an image source instructs the electronic display to display the first image frame;
detect, using the at least one processor, whether a second image frame received directly after the first image frame instructs the electronic display to display the second image frame;
detect, using the at least one processor, whether a third image frame received directly after the second image frame instructs the electronic display to display the third image frame;
determine, using the at least one processor, that display image data has a 2:3 cadence when the second image frame does not instruct the electronic display to display the second image frame and the third image frame instructs the electronic display to display the third image frame;
determine, using the at least one processor, that the display image data has a 3:2 cadence when the second image frame does not instruct the electronic display to display the second image frame and the third image frame does not instruct the electronic display to display the third image frame; and
instruct, using the at least one processor, the electronic display to:
display the first image frame without a delay relative to when the first image frame is received from the image source when the display image data has the 2:3 cadence; and
display the first image frame with a first half period delay relative to when the first image frame is received from the image source when the display image data has the 3:2 cadence to facilitate displaying video content at an integer multiple of a capture rate of the video content while maintaining operational synchronization between the electronic display and the image source.

20. The tangible, non-transitory, computer readable medium of claim 19, comprising instructions to instruct, using the at least one processor, the electronic display to display the third image frame with a second half period delay relative to when the third image frame is received from the image source when the display image data has the 2:3 cadence to facilitate displaying the video content at the integer multiple of the capture rate while maintaining operational synchronization between the electronic display and the image source.

21. The tangible, non-transitory, computer readable medium of claim 19, wherein the instructions to instruct the electronic display to display the first image frame comprise instructions to instruct the electronic display to display the first image frame without interpolation with any other frames of the video content.

* * * * *

UNITED STATES PATENT AND TRADEMARK OFFICE
CERTIFICATE OF CORRECTION

PATENT NO. : 9,940,896 B2
APPLICATION NO. : 14/636693
DATED : April 10, 2018
INVENTOR(S) : Christopher P. Tann et al.

Page 1 of 1

It is certified that error appears in the above-identified patent and that said Letters Patent is hereby corrected as shown below:

In the Claims

In Column 17, Line 43, please renumber listed Claim 4 as new Claim 8 and therefore, insert new Claim 4 as follows:
--4. The electronic display of claim 1, wherein the timing controller is configured to determine that the capture rate of the video content is 24 Hz when the cadence with which the first image frame and second image frame are received is a 2:3 cadence or a 3:2 cadence.--.

In Column 18, Lines 16-45, please delete current Claim 8 in its entirety.

In Column 19, Line 37 (Claim 15), replace "video content and" with --video content; and--.

Signed and Sealed this
Third Day of July, 2018

Andrei Iancu
*Director of the United States Patent and Trademark Office*